(12) United States Patent
Chung et al.

(10) Patent No.: US 11,698,516 B2
(45) Date of Patent: Jul. 11, 2023

(54) HEAD MOUNTED DISPLAY DEVICE AND NEAR-EYE LIGHT FIELD DISPLAY DEVICE THEREOF

(71) Applicant: Homer Chen, Thousand Oaks, CA (US)

(72) Inventors: Sheng-Lung Chung, New Taipei City (TW); Homer Chen, Thousand Oaks, CA (US); Jiun-Woei Huang, Taipei City (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 590 days.

(21) Appl. No.: 16/695,608

(22) Filed: Nov. 26, 2019

(65) Prior Publication Data

US 2020/0166734 A1 May 28, 2020

Related U.S. Application Data

(60) Provisional application No. 62/771,665, filed on Nov. 27, 2018.

(51) Int. Cl.
*G02B 13/22* (2006.01)
*G02B 27/01* (2006.01)

(52) U.S. Cl.
CPC ......... *G02B 13/22* (2013.01); *G02B 27/0172* (2013.01)

(58) Field of Classification Search
CPC ............... G02B 27/0176; G02B 27/30; G02B 27/0179; G02B 27/0172; G02B 27/017; G02B 27/0149; G02B 27/0101; G02B 27/01; G02B 2027/0127; G02B 2027/0145; G02B 2027/011; G02B 2027/0174; G02B 2027/0134; G02B 30/52; G02B 30/10; G02B 13/22; H04N 5/7491
USPC ............ 359/462–477, 629–633, 13–14, 663; 348/51–60, 42, 115; 349/11, 15; 345/7–9
See application file for complete search history.

(56) References Cited

U.S. PATENT DOCUMENTS

| | | | | |
|---|---|---|---|---|
| 5,210,646 | A * | 5/1993 | Mercado | G02B 13/00 359/796 |
| 2007/0273983 | A1* | 11/2007 | Hebert | G02B 5/1895 359/708 |
| 2013/0222384 | A1* | 8/2013 | Futterer | H04N 13/344 345/426 |
| 2015/0277129 | A1* | 10/2015 | Hua | G02B 27/0172 359/462 |
| 2019/0018247 | A1* | 1/2019 | Gao | G02B 27/0172 |

* cited by examiner

*Primary Examiner* — Travis S Fissel
(74) *Attorney, Agent, or Firm* — McClure, Qualey & Rodack, LLP

(57) ABSTRACT

A near-eye light field display device includes a plurality of sub-aperture light field emitting modules and a bi-telecentric lens group. The plurality of sub-aperture light field emitting modules are adapted to generate a plurality of sub-aperture light fields. The bi-telecentric lens group is disposed on one side of the plurality of sub-aperture light field emitting modules, wherein the plurality of sub-aperture light fields pass through the bi-telecentric lens group and are converted into an exit light field by the bi-telecentric lens group, and the exit light field is incident on a receiver.

19 Claims, 12 Drawing Sheets

HEAD MOUNTED DISPLAY DEVICE AND NEAR-EYE LIGHT FIELD DISPLAY DEVICE THEREOF

CROSS-REFERENCE TO RELATED APPLICATIONS

This application claims the benefit of U.S. Provisional Application No. 62/771,665, filed Nov. 27, 2018, the entirety of which is incorporated by reference herein.

BACKGROUND

Technical Field

The disclosure relates to a display device and more particularly to a head mounted display device and a near-eye light field display device for displaying 3D image.

Description of the Related Art

Virtual reality (VR) devices generate 3D sensation based on the stereoscopic vision principle. Because the distance between the display panel and the eye of the user is fixed, the accommodation of the eyes does not change with the vergence. This leads to the well-known vergence accommodation conflict (VAC) that makes the user feel dizzy and uncomfortable.

The light field display device is a display device using light field display technology to produce a light field, so that the observer may see the light field with depth perception. The light field with depth perception can avoid the impact of vergence-accommodation conflict.

SUMMARY

In one embodiment of the present disclosure, a near-eye light field display device is provided. The near-eye light field display device includes a plurality of sub-aperture light field emitting modules and a bi-telecentric lens group. The sub-aperture light field emitting modules are adapted to generate a plurality of sub-aperture light fields. The bi-telecentric lens group is disposed on one side of the sub-aperture light field emitting modules, wherein the sub-aperture light fields pass through the bi-telecentric lens group and are converted into an exit light field by the bi-telecentric lens group, and the exit light field is incident on a receiver.

In one embodiment of the present disclosure, a head mounted display device is provided. The head mounted display device includes two near-eye light field display devices, wherein each near-eye light field display device comprises a plurality of sub-aperture light field emitting modules and a bi-telecentric lens group. The sub-aperture light field emitting modules are adapted to generate a plurality of sub-aperture light fields. The bi-telecentric lens group is disposed on one side of the sub-aperture light field emitting modules. The sub-aperture light fields pass through the bi-telecentric lens group and are converted into an exit light field by the bi-telecentric lens group, and the exit light field is incident on a receiver.

The above-described objects, features, and advantages of the invention will be apparent from the several embodiments, figures, and description, the details of which are provided below.

BRIEF DESCRIPTION OF THE DRAWINGS

Aspects of this disclosure are best understood from the following detailed description when read with the accompanying figures. It should be noted that, in accordance with common practice in the industry, various features are not drawn to scale. In fact, the dimensions of the various features may be arbitrarily increased or reduced for clarity of discussion.

DETAILED DESCRIPTION

Figure 1:
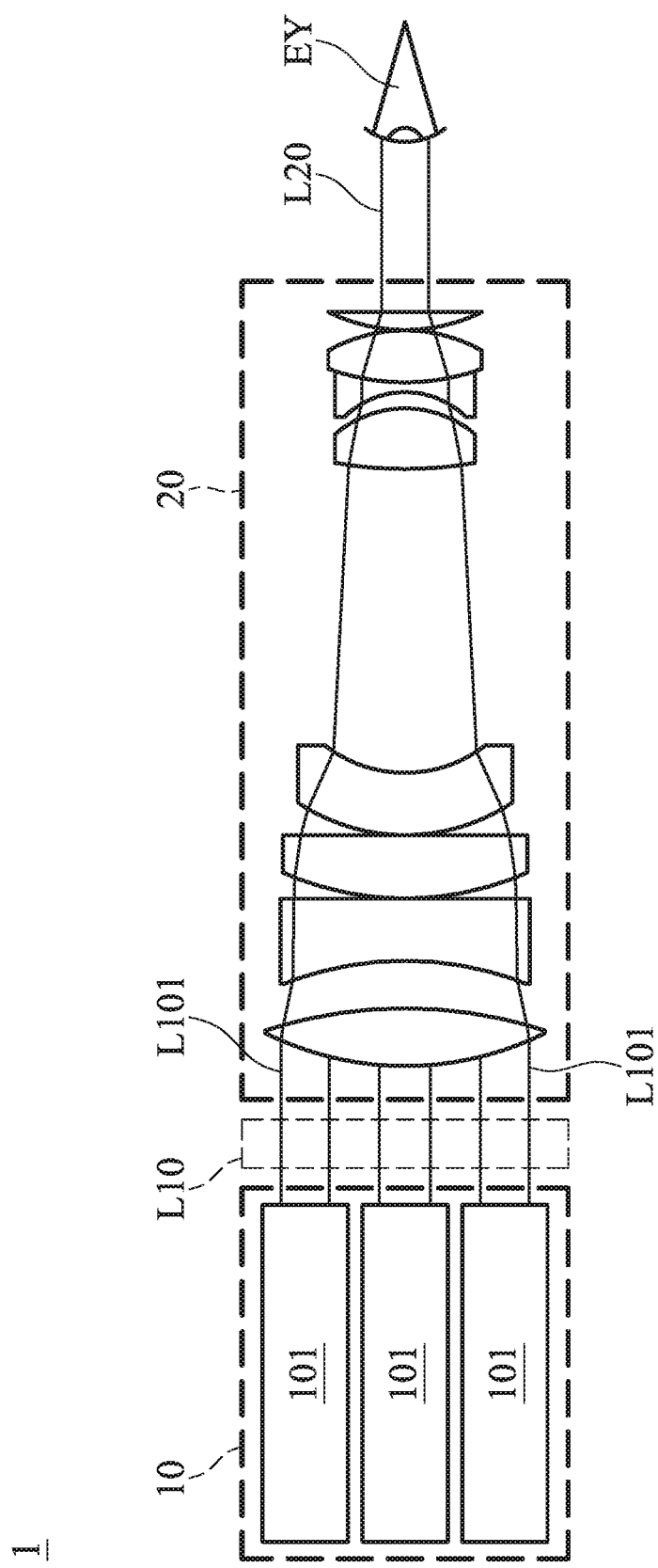
FIG. 1 is a schematic view of a near-eye light field display device in accordance with an embodiment of the present disclosure.

The following disclosure provides many different embodiments, or examples, for implementing different features of the subject matter provided. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features. In addition, the present disclosure may repeat reference numerals and/or letters in the various examples. This repetition is for simplicity and clarity and does not in itself dictate a relationship between the various embodiments and/or configurations discussed.

Furthermore, spatially relative terms, such as "over," "below," "lower," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented, and the spatially relative descriptors used herein may likewise be interpreted accordingly.

The terms "about," "approximately," and "substantially" used herein generally refer to the value of an error or a range within 20 percent, preferably within 10 percent, and more preferably within 5 percent, within 3 percent, within 2 percent, within 1 percent, or within 0.5 percent. If there is no specific description, the values mentioned are to be regarded as an approximation that is an error or range expressed as "about," "approximate," or "substantially."

Although some embodiments are discussed with steps performed in a particular order, these steps may be performed in another logical order. Some of the features described below can be replaced or eliminated for different embodiments. It is understandable that additional operations may be performed before, during, or after the method described, and that in other embodiments of the method, some of the operations may be substituted or omitted.

FIG. 1 is a schematic view of a near-eye light field display device 1 in accordance with an embodiment of the present disclosure. Referring to FIG. 1, the near-eye light field display device 1 includes a plurality of sub-aperture light field emitting modules 101 and a bi-telecentric lens group 20, wherein the sub-aperture light field emitting modules 101 may be indicated by display device 10 for convenience of explanation. The sub-aperture light field emitting modules 101 are adapted to generate a plurality of sub-aperture light fields L101. The sub-aperture light fields L101 pass through the bi-telecentric lens group 20 and are converted into an exit light field L20 by the bi-telecentric lens group 20, and the exit light field L20 is incident on a receiver EY. It should be noted that the plurality of sub-aperture light fields L101 generated by the sub-aperture light field emitting modules 101 may be an entrance light field L10.

In the embodiment, the receiver EY, for example, may be the eye of a user, and the eye of the user may see a light field (not shown) with continuous depth perception. The near-eye light field display device 1 of the embodiment, for example, may be applied to augmented reality or virtual reality. By disposing the bi-telecentric lens group 20 on the near-eye light field display device 1, which may produce a continuous light field with a much higher image quality than common light field display device with microlens array, so that the near-eye light field display device 1 may be suitable for applications requiring very high image quality such as medical treatment, surgery, military applications or industrial applications. The specific operation details will be presented later in the specification. It should be noted that the image quality of the common light field display device with microlens array suffers from the diffraction limit and the aberration of the microlens, thus limiting its image quality.

In the embodiment, the near-eye light field display device 1, for example, includes seven sub-aperture light field emitting modules 101, but the disclosure is not limited thereto. It should be noted that, in the schematic view, FIG. 1 shows only three of the sub-aperture light field emitting modules 101 for explanation, and the arrangement of the sub-aperture light field emitting modules 101 will be described in detail in the embodiments of FIG. 3 and FIG. 4. In the embodiment, the lens structure of the bi-telecentric lens group 20 shown in FIG. 1 is merely an example, but the disclosure is not limited thereto.

Figure 2A:
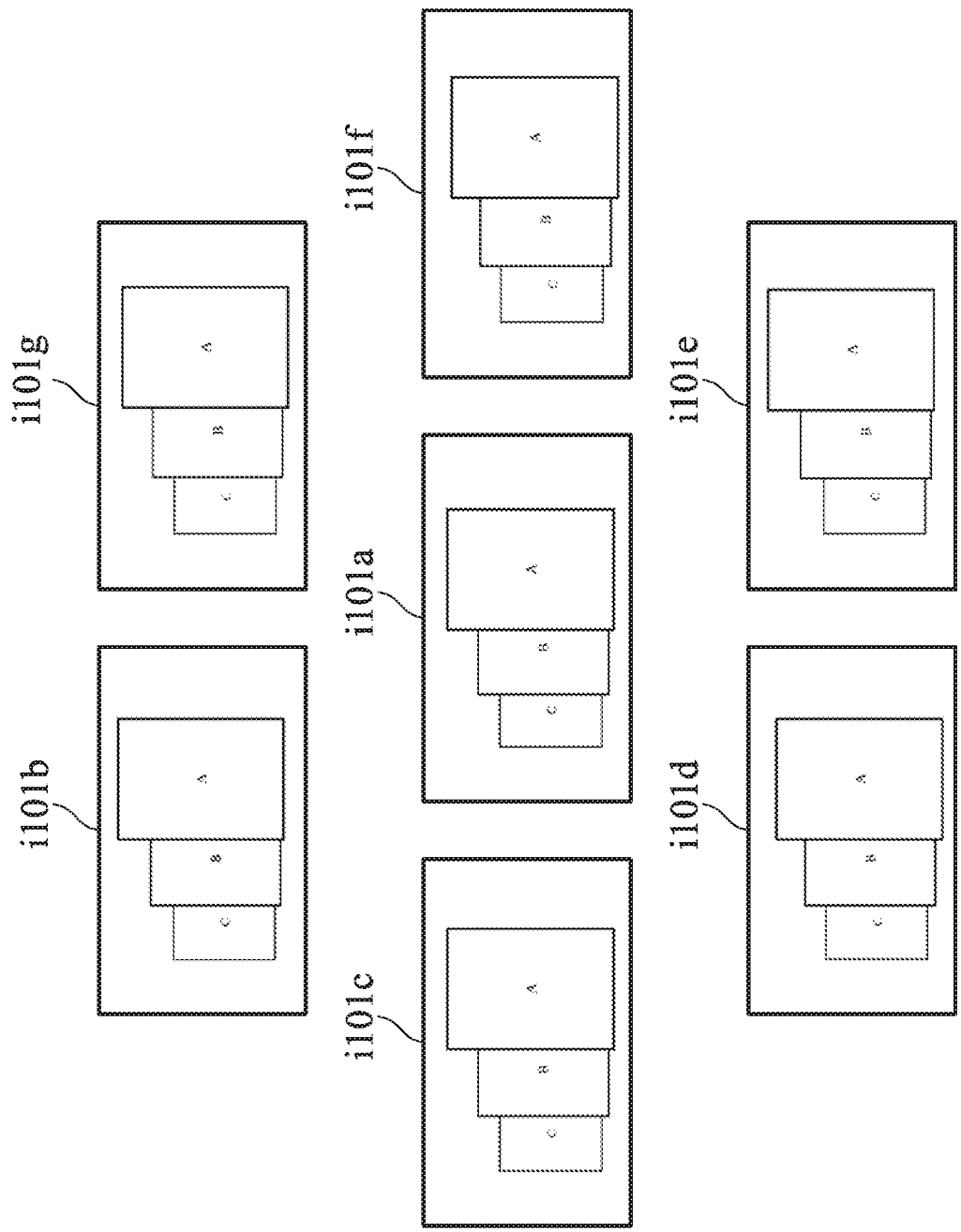
FIG. 2A is a schematic view of a plurality of sub-images respectively generated by a plurality of sub-aperture light field emitting modules of the near-eye light field display device in accordance with an embodiment of the present disclosure.

Also referring to FIG. 2A, which is a schematic view of sub-images i101a, i101b, i101c, i101d, i101e, i101f, and i101g respectively generated by the plurality of sub-aperture light field emitting modules 101 of the near-eye light field display device 1 shown in FIG. 1. The sub-images i101a, i101b, i101c, i101d, i101e, i101f, and i101g, for example, may be captured by camera arrays (not shown) with the same or similar arrangement as the sub-aperture light field emitting modules 101, but the disclosure is not limited thereto. The sub-images i101a, i101b, i101c, i101d, i101e, i101f, and i101g shown in FIG. 2A are merely an example of the images of the sub-aperture light fields L101 generated by the sub-aperture light field emitting modules 101 used for illustration, but the disclosure is not limited thereto. As shown in FIG. 2A, in the embodiment, the sub-image i101a is defined as a central sub-image and the sub-images i101b, i101c, i101d, i101e, i101f, and i101g surround the central sub-image (i.e., sub-image i101a).

Figure 2B:
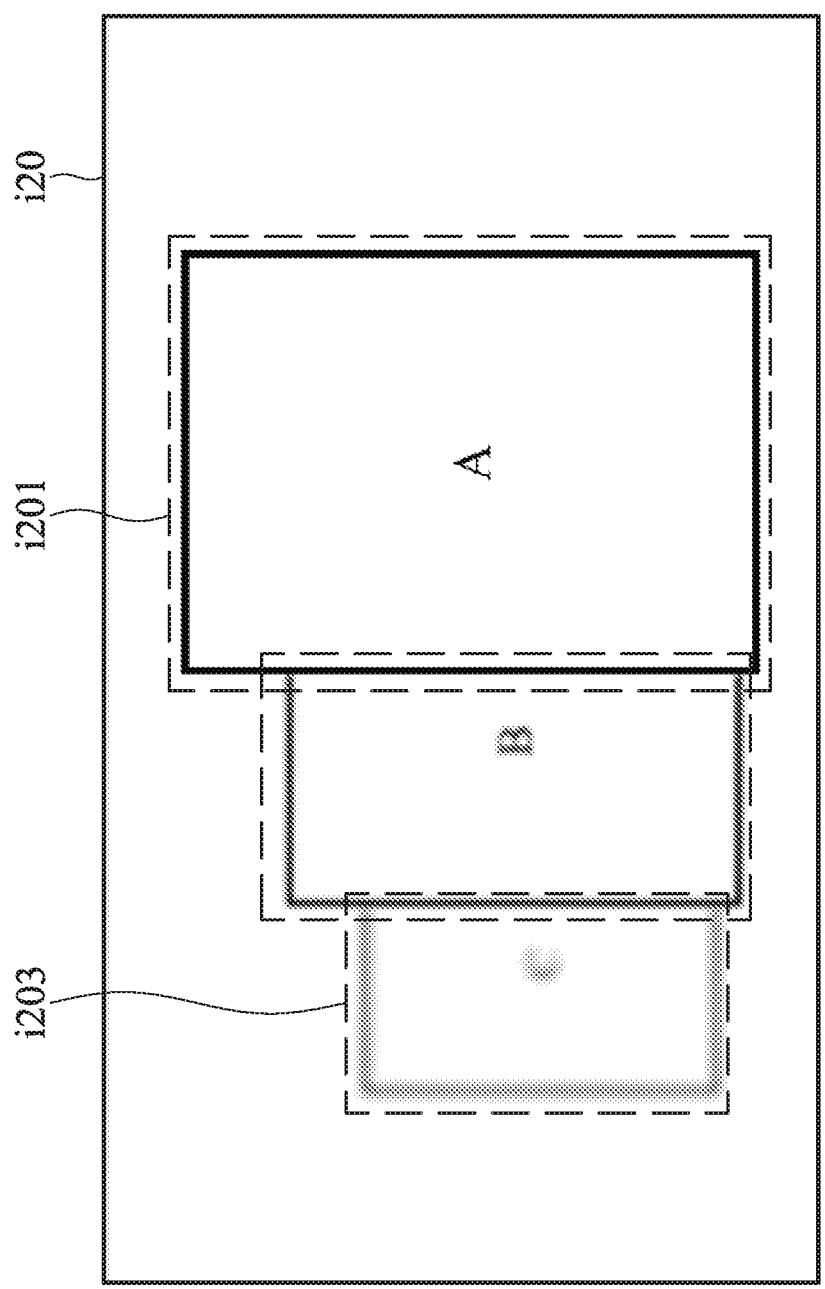
FIG. 2B is a schematic view of an image of the exit light field observed by the eye of the user through the near-eye light field display device in accordance with an embodiment of the present disclosure.
Figure 2C:
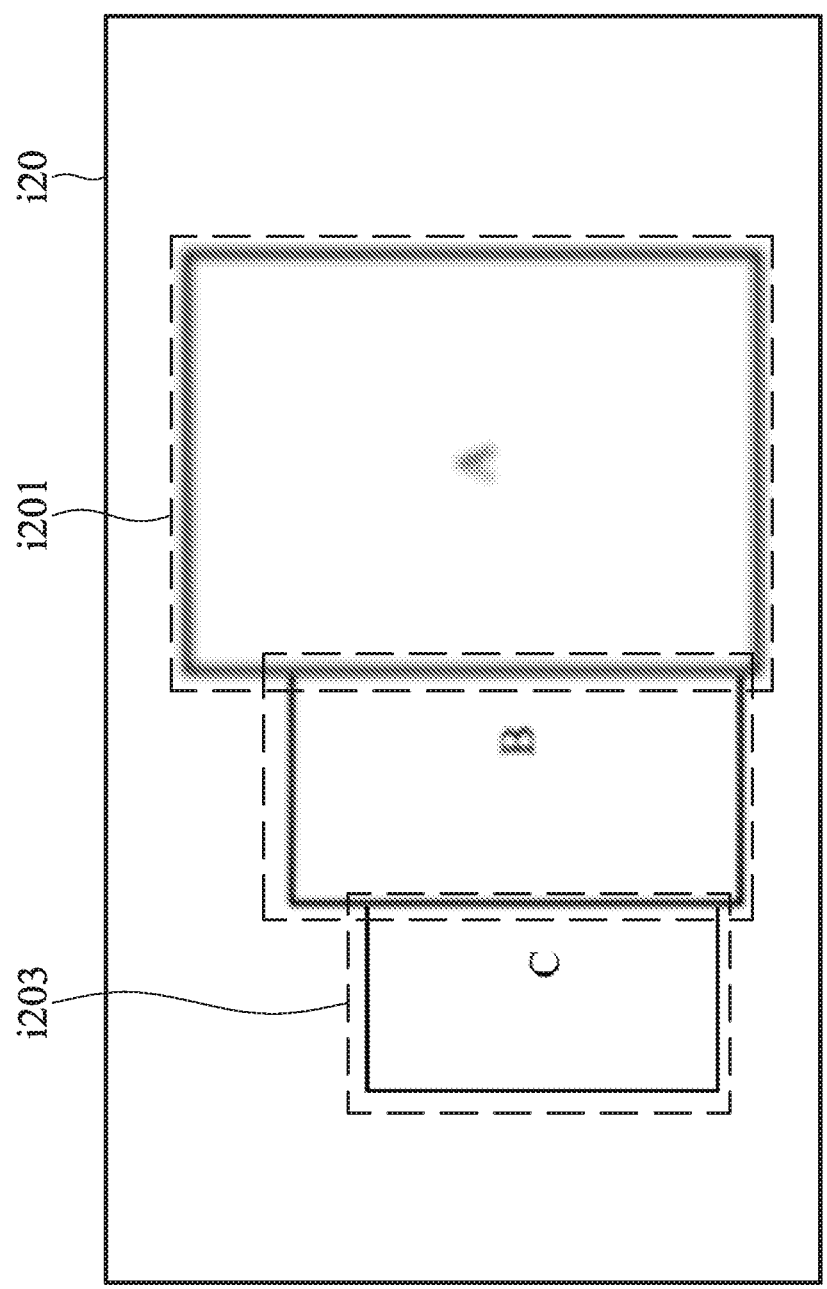
FIG. 2C is a schematic view of an image of the exit light field observed by the eye of the user through the near-eye light field display device in accordance with an embodiment of the present disclosure.

Also referring to FIGS. 2B and 2C, FIG. 2B is a schematic view of an image of the exit light field L20 observed by the eye (receiver EY) of the user through the near-eye light field display device 1 of the embodiment shown in FIG. 1, and FIG. 2C is also a schematic view of an image of the exit light field L20 observed by the eye of the user through the near-eye light field display device 1. In the embodiment, after the sub-aperture light fields L101 pass through the bi-telecentric lens group 20, the sub-aperture light fields L101 are converted into the exit light field L20 with a light field image i20 by the bi-telecentric lens group 20, wherein the light field image i20 is an image of the exit light field L20. The exit light field L20 is incident on the receiver EY, so that the user may view the light field image i20 shown in FIG. 2B or FIG. 2C. Thus, the near-eye light field display device 1 of the embodiment enables the user to view the light field image i20 with continuous depth perception through the sub-aperture light field emitting modules 101 and the bi-telecentric lens group 20. The light field image i20 with depth perception can avoid the impact of vergence-accommodation conflict.

For example, the light field image i20 includes an image of three objects, each of which is at a different distance from the eye of the user. As shown in FIG. 2B, when the eye of the user is focused on the nearest object, the image i201 of the nearest object is sharp (in focus), while the image i203 of the furthest object is blurry (out of focus). As shown in FIG. 2C, when the eye is focused on the furthest object, the image i203 of the furthest object is sharp (in focus), while the image i201 of the nearest object is blurry (out of focus). It is worth noting that the light field image i20 provided by the near-eye light field display device 1 with the sub-aperture light field emitting modules 101 and the bi-telecentric lens group 20 is a light field with a continuous depth of field, while the image provided by the common light field display device with microlens array is not. A light field with continuous depth of field allows the eye of the user to focus at any distance from the eye rather than a few specific distances.

It is important to note that the field of view of each of the sub-images i101a, i101b, i101c, i101d, i101e, i101f, and i101g of the sub-aperture light fields L101 is the same as or similar to the field of view of the light field image i20 of the exit light field L20. For example, the light field image i20 in FIG. 2B or FIG. 2C includes the image of three objects, and each of the sub-images i101a, i101b, i101c, i101d, i101e, i101f, and i101g also includes an image of all three objects. In general, the shooting angles of the images of the sub-images i101a, i101b, i101c, i101d, i101e, i101f, and i101g are slightly different due to the arrangement of the camera arrays (not shown) taking them. However, the sub-images i101a, i101b, i101c, i101d, i101e, i101f, and i101g generated by the sub-aperture light field emitting modules 101 shown in FIG. 2A are merely examples, and the disclosure is not limited thereto.

Figure 3:
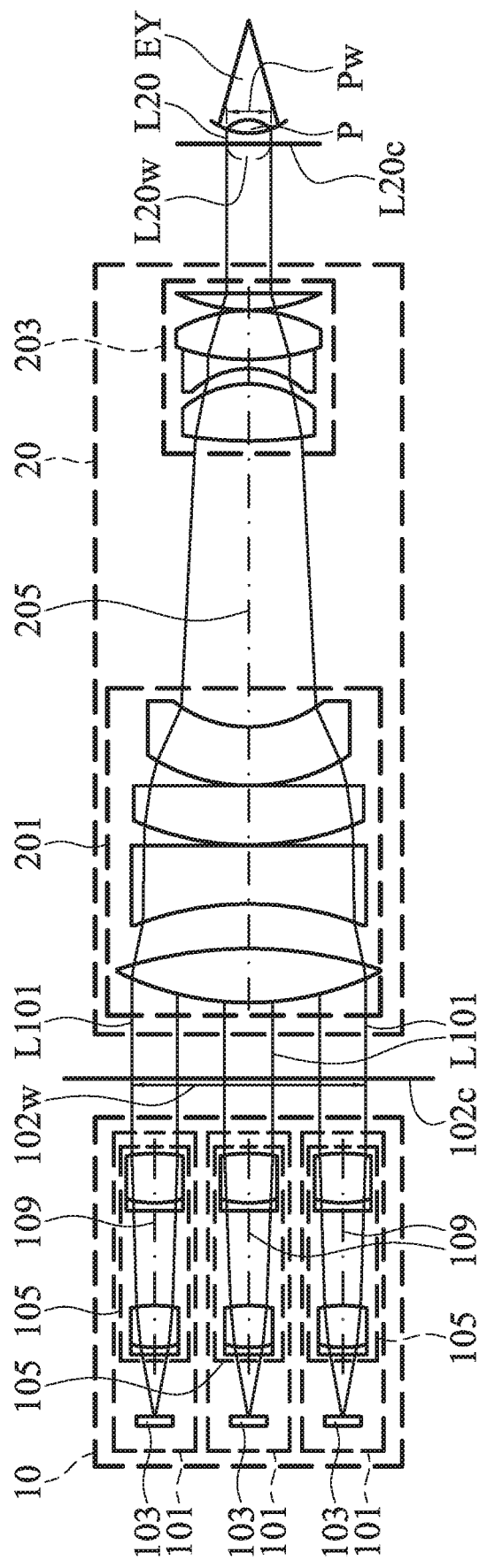
FIG. 3 is a schematic view of a near-eye light field display device in accordance with another embodiment of the present disclosure.

FIG. 3 is a schematic view of a near-eye light field display device 2 in accordance with another embodiment of the present disclosure. Referring to FIG. 3, in the embodiment, the near-eye light field display device 2 includes a plurality of sub-aperture light field emitting modules 101 (display device 10) and a bi-telecentric lens group 20. The near-eye light field display device 2 of the embodiment has a similar structure and function as the near-eye light field display device 1 shown in FIG. 1. The embodiment shown in FIG. 3 is different from the embodiment shown in FIG. 1 in that each sub-aperture light field emitting module 101 includes a light emitting panel 103 and a projection lens 105. In the schematic view, FIG. 3 shows only three sub-aperture light field emitting modules 101. The light emitting panel 103 is adapted to generate a sub-aperture light field L101, and the projection lens 105 is adapted to project the sub-aperture light field L101 to the bi-telecentric lens group 20, so that the eye of the user may see a light field with continuous depth perception from the bi-telecentric lens group 20.

In the embodiment, the bi-telecentric lens group 20 of the near-eye light field display device 2 includes a first lens group 201 and a second lens group 203, and the first lens group 201 is located between the plurality of sub-aperture light field emitting modules 101 and the second lens group 203.

In the embodiment, a width L20w of a cross section L20c of the exit light field L20 passing through the bi-telecentric lens group 20 is less than a width 102w of a cross section 102c of the sub-aperture light fields L101 incident to the bi-telecentric lens group 20, wherein the width 102w is the width of the sub-aperture light fields L101 in the cross section 102. Therefore, in the embodiment, the bi-telecentric lens group 20 compresses the incident sub-aperture light fields L101 and reforms them into a compact exit light field L20 in front of the receiver EY. Thus, the near-eye light field display device 2 may provide the exit light field L20 with a wider field of view. In addition, the bi-telecentric lens group 20, for example, may reduce the aberration of the projection lenses 105 and improve the image quality of the exit light field L20. Furthermore, due to the telecentricity of the bi-telecentric lens group 20, the projection lenses 105, for example, may be arranged in parallel, and such arrangement may save the effort required for tilt alignment of the projection lenses.

In the embodiment, the distance between the cross section L20c and the receiver EY, for example, may be between 0 mm and 3 mm, but the disclosure is not limited thereto. In one embodiment, the distance between the cross section L20c and the receiver EY, for example, may be 0 mm, but the disclosure is not limited thereto.

In the embodiment, the bi-telecentric lens group 20 compresses the incident sub-aperture light fields L101 and reforms them into a compact exit light field L20 equal to or close to the size of the pupil of a human eye, so that the near-eye light field display device 2 may provide the exit light field L20 with a wider field of view and improve the image quality. For example, the receiver EY (the eye of the user) includes an incident aperture P (for example, the pupil of the eye). In the embodiment, the width L20w of the cross section L20c of the exit light field L20 passing through the bi-telecentric lens group 20 is equal to or close to a width Pw of the incident aperture P of the receiver EY. Specifically, the width L20w of the cross section L20c of the exit light field L20 passing through the bi-telecentric lens group 20, for example, may be between 2 mm and 8 mm, but the disclosure is not limited thereto. In general, the diameter of the pupil of a human eye is between 2 mm and 8 mm.

It is worth noting that, in the embodiment, all sub-aperture light field emitting modules 101 are identical. Since the sub-aperture light fields L101 may be converted by the bi-telecentric lens group 20, the sub-aperture light field emitting modules 101 do not need to adopt a special design such as different focal lengths or different angles of the projection lenses 105, which may reduce the cost and simplify the structure of the near-eye light field display device 2.

In the embodiment, the projection lenses 105 of the sub-aperture light field emitting modules 101 may be Petzval lenses, for example, but the disclosure is not limited thereto. The sub-aperture light fields L101 generated by the sub-aperture light field emitting modules 101 with the projection lenses 105, and the image quality of the exit light field L20 may be improved.

Specifically, the bi-telecentric lens group 20 includes an optical axis 205, and each projection lens 105 includes an optical axis 109. Each light emitting panel 103 includes a display panel (shown in FIG. 4), wherein the display panel is adapted to generate light field.

Figure 4:
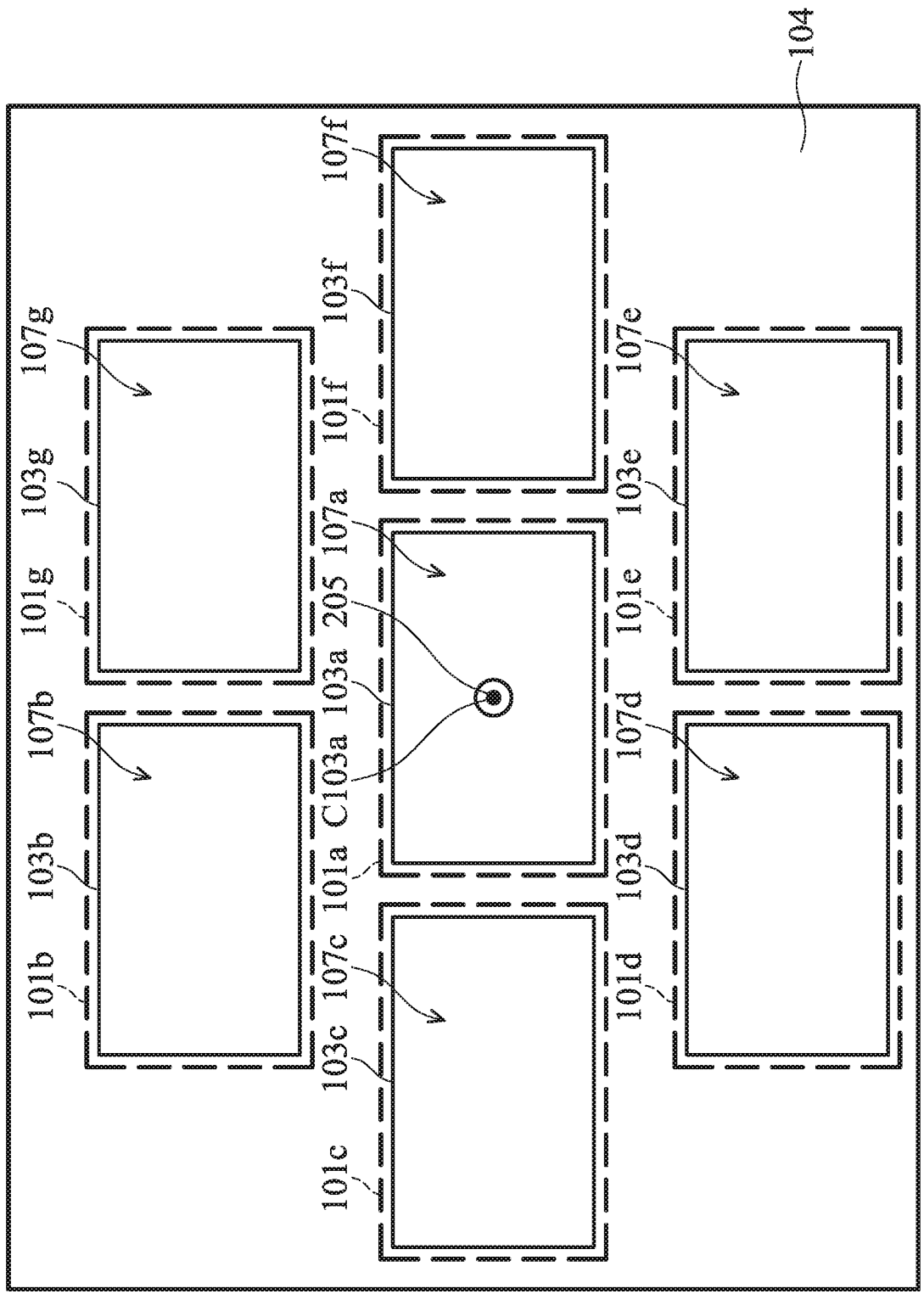
FIG. 4 is a schematic view of a plurality of light emitting panels of the near-eye light field display device in accordance with another embodiment of the present disclosure.

Also referring to FIG. 4, which is a schematic view of a plurality of light emitting panels 103 of the near-eye light field display device 2 shown in FIG. 3. FIG. 4 indicates the arrangement of the sub-aperture light field emitting modules 101 of the near-eye light field display device 2, in which the plurality of sub-aperture light field emitting modules 101 are represented by the sub-aperture light field emitting modules 101a, 101b, 101c, 101d, 101e, 101f, and 101g, and the plurality of light emitting panels 103 are represented by the light emitting panels 103a, 103b, 103c, 103d, 103e, 103f, and 103g for convenience of explanation. In this embodiment, the sub-aperture light field emitting modules 101a, 101b, 101c, 101d, 101e, 101f, and 101g of FIG. 4 are identical to the sub-aperture light field emitting modules 101 of FIG. 3, and the light emitting panels 103a, 103b, 103c, 103d, 103e, 103f, and 103g of FIG. 4 are identical to the light emitting panels 103 of FIG. 3. In the embodiment, the near-eye light field display device 2 includes seven sub-aperture light field emitting modules 101a, 101b, 101c, 101d, 101e, 101f, and 101g as an example, and the light emitting panels 103a, 103b, 103c, 103d, 103e, 103f, and 103g of the sub-aperture light field emitting modules 101a, 101b, 101c, 101d, 101e, 101f, and 101g include display panels 107a, 107b, 107c, 107d, 107e, 107f, and 107g, respectively. Specifically, the display panels 107a, 107b, 107c, 107d, 107e, 107f, and 107g of the light emitting panels 103a, 103b, 103c, 103d, 103e, 103f, and 103g are perpendicular to the optical axis 205 of the bi-telecentric lens group 20, and optical axes 109 of the projection lenses 105 is parallel to the optical axis 205 of the bi-telecentric lens group 20.

Specifically, the sub-aperture light field emitting modules 101a, 101b, 101c, 101d, 101e, 101f, and 101g of the near-eye light field display device 2 includes a center sub-aperture light field emitting module 101a and a plurality of surrounding sub-aperture light field emitting modules 101b, 101c, 101d, 101e, 101f, and 101g. FIG. 4 shows that the center sub-aperture light field emitting module 101a includes the light emitting panel 103a with the display panel 107a, and the surrounding sub-aperture light field emitting modules 101b, 101c, 101d, 101e, 101f, and 101g include the light emitting panels 103b, 103c, 103d, 103e, 103f, and 103g with display panels 107b, 107c, 107d, 107e, 107f, and 107g. The display panels 107a, 107b, 107c, 107d, 107e, 107f, and 107g of the light emitting panels 103a, 103b, 103c, 103d, 103e, 103f, and 103g of the center sub-aperture light field emitting module 101a and the surrounding sub-aperture light field emitting modules 101b, 101c, 101d, 101e, 101f, and 101g are disposed on a plane 104 perpendicular to the optical axis 205 of the bi-telecentric lens group 20. A center c103a of the display panel 107a of the light emitting panel 103a of the center sub-aperture light field emitting module 101a is located on the optical axis 205 of the bi-telecentric lens group 20, and the display panels 107b, 107c, 107d, 107e, 107f, and 107g of the light emitting panels 103b, 103c, 103d, 103e, 103f, and 103g of the surrounding sub-aperture light field emitting modules 101b, 101c, 101d, 101e, 101f, and 101g surround the display panel 107a of the light emitting panel 103a of the center sub-aperture light field emitting module 101a. By disposing the sub-aperture light field emitting modules 101 on the near-eye light field display device 2 and each sub-aperture light field emitting module 101 includes a light emitting panel 103 and a projection lens 105 (shown in FIG. 3), it may produce a continuous light field with a much higher image quality than common light field display device with microlens array.

In the embodiment, the near-eye light field display device 2 includes seven sub-aperture light field emitting modules 101a, 101b, 101c, 101d, 101e, 101f, and 101g is merely an example, but the disclosure is not limited thereto. The arrangement of the light emitting panels 103a, 103b, 103c, 103d, 103e, 103f, and 103g of the sub-aperture light field emitting modules 101a, 101b, 101c, 101d, 101e, 101f, and 101g shown in FIG. 4 is merely an example, but the disclosure is not limited thereto. In the embodiment, the light emitting panel 103, for example, may be exemplified by an LCoS (Liquid Crystal On Silicon) display device, an LCD (liquid-crystal display), an organic light-emitting diode (OLED) display device, a microLED display device, or a DMD (Digital Micromirror Device) display device, but the disclosure is not limited thereto.

Figure 5:
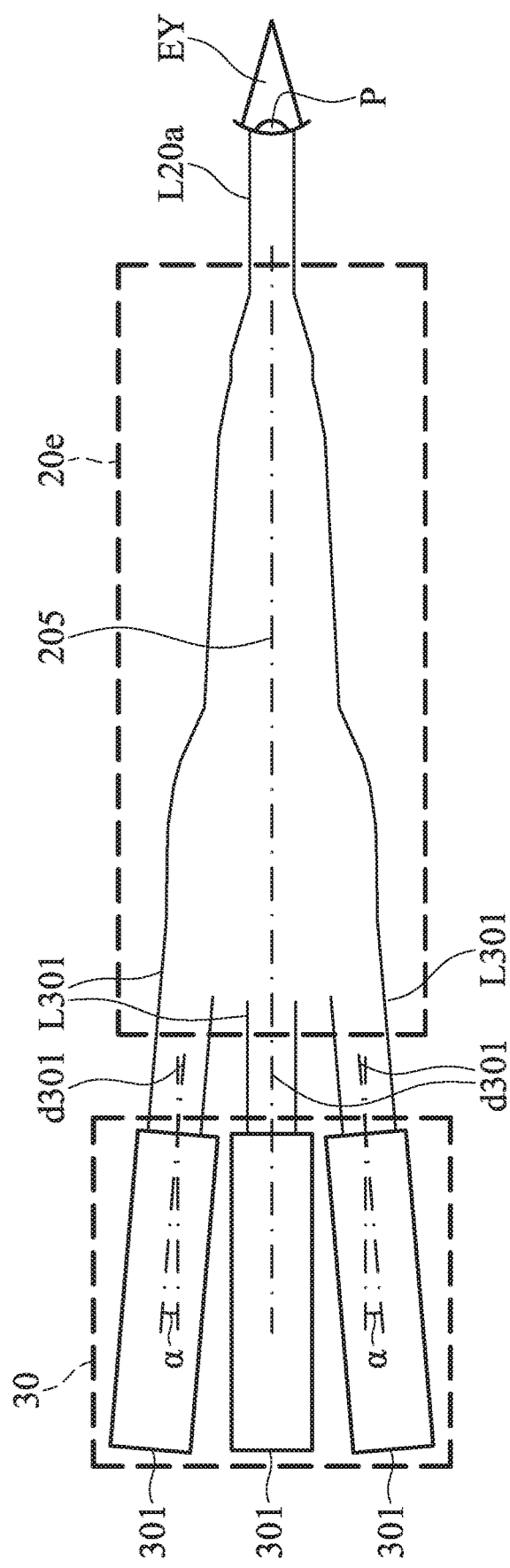
FIG. 5 is a schematic view of a near-eye light field display device in accordance with still another embodiment of the present disclosure.

FIG. 5 is a schematic view of a near-eye light field display device 3 in accordance with still another embodiment of the present disclosure. Referring to FIG. 5, in the embodiment, the near-eye light field display device 3 includes a plurality of sub-aperture light field emitting modules 301 and a bi-telecentric lens group 20e, wherein the sub-aperture light field emitting modules 301 may be indicated by the display device 30 for convenience of explanation. The near-eye light field display device 3 of the embodiment has a similar structure and function as the near-eye light field display device 2 shown in FIG. 3. The embodiment shown in FIG. 5 is different from the embodiment shown in FIG. 3 in that a transmission direction d301 of the sub-aperture light field L301 generated by the sub-aperture light field emitting module 301 is tilted toward the optical axis 205 of the bi-telecentric lens group 20e. In the schematic view, FIG. 5 shows that the transmission directions d301 of the sub-aperture light fields L301 generated by the sub-aperture light field emitting modules 301 are tilted toward the optical axis 205 at an angle α. Therefore, by tilting the transmission directions d301 toward the optical axis 205, it may improve the image quality of the exit light field L20a.

In the embodiment, the structure and function of the sub-aperture light field emitting modules 301 are similar to the sub-aperture light field emitting modules 101 shown in FIG. 3, and the structure and function of the bi-telecentric lens group 20e is similar to the bi-telecentric lens group 20 shown in FIG. 3. In the embodiment, the tilting of the transmission directions d301, for example, may be achieved by tilting the sub-aperture light field emitting modules 301, but the disclosure is not limited thereto.

Figure 6:
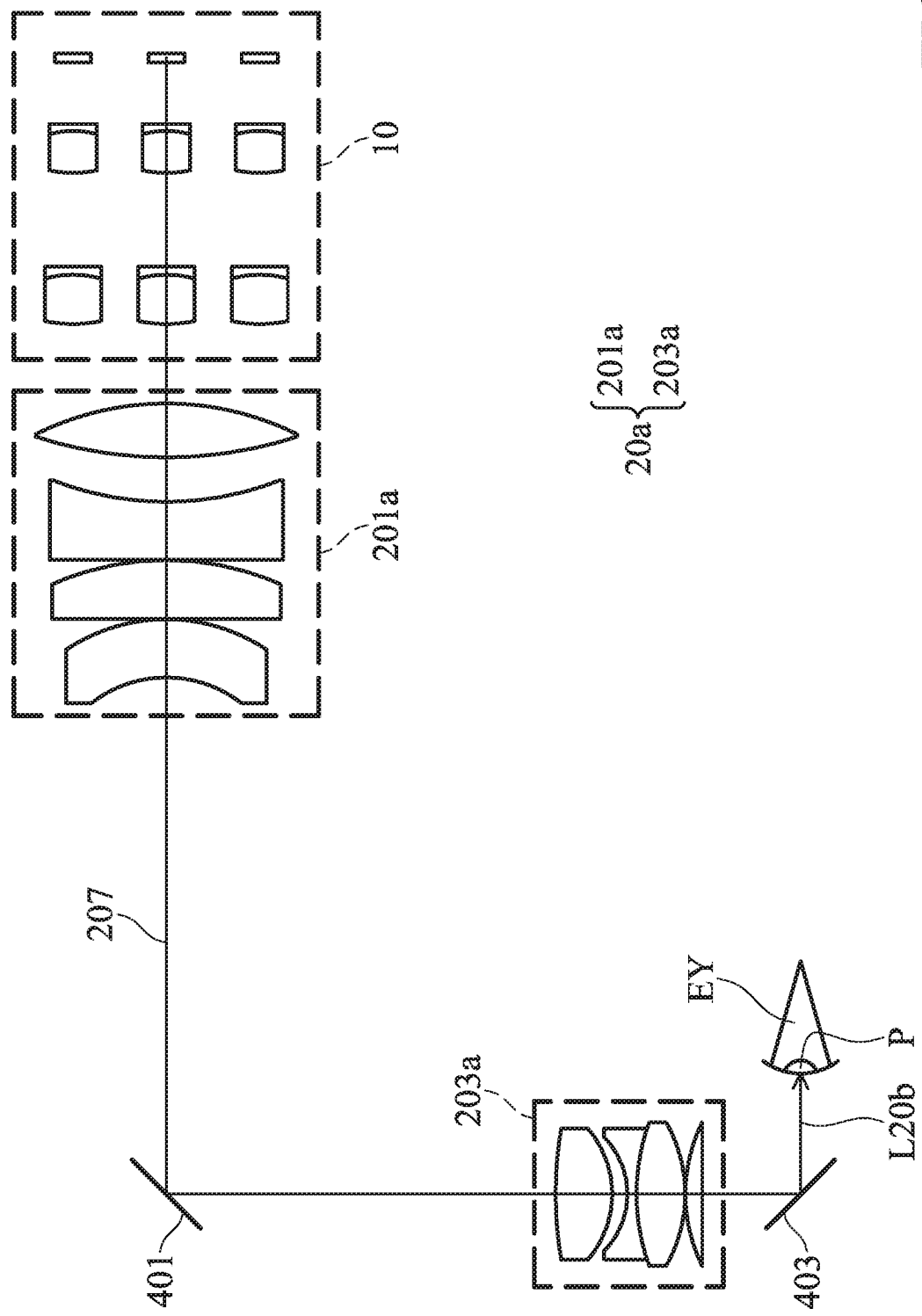
FIG. 6 is a schematic view of a near-eye light field display device in accordance with still another embodiment of the present disclosure.

FIG. 6 is a schematic view of a near-eye light field display device 4 in accordance with still another embodiment of the present disclosure. Referring to FIG. 6, in the embodiment, the near-eye light field display device 4 includes a plurality of sub-aperture light field emitting modules (display device 10) and a bi-telecentric lens group 20a, wherein the plurality of sub-aperture light field emitting modules is indicated by the display device 10 for convenience of explanation. The near-eye light field display device 4 of the embodiment has a similar structure and function as the near-eye light field display device 2 shown in FIG. 3. The embodiment shown in FIG. 6 is different from the embodiment shown in FIG. 3 in that the near-eye light field display device 4 further includes a first light-directing element 401 and a second light-directing element 403. The bi-telecentric lens group 20a includes a first lens group 201a and a second lens group 203a, and the first lens group 201a is located on the optical path 207 between the sub-aperture light field emitting modules (display device 10) and the second lens group 203a. In the embodiment, the structure and function of the first lens group 201a and the second lens group 203a of FIG. 6 are similar to the first lens group 201 and the second lens group 203 of FIG. 3.

The first light-directing element 401 is disposed on the optical path 207 between the first lens group 201a and the second lens group 203a, and the first light-directing element 401 is adapted to transmit the sub-aperture light fields (not shown) from the first lens group 201a to the second lens group 203a. The second lens group 203a is located between the first light-directing element 401 and the second light-directing element 403, and the second light-directing element 403 is adapted to transmit the exit light field L20b from the second lens group 203a to the receiver EY. In the embodiment, the second light-directing element 403 is adjacent to the receiver EY.

By disposing the first light-directing element 401 and the second light-directing element 403, the near-eye light field display device 4 may be set in various ways and maintain the same image quality.

Figure 7:
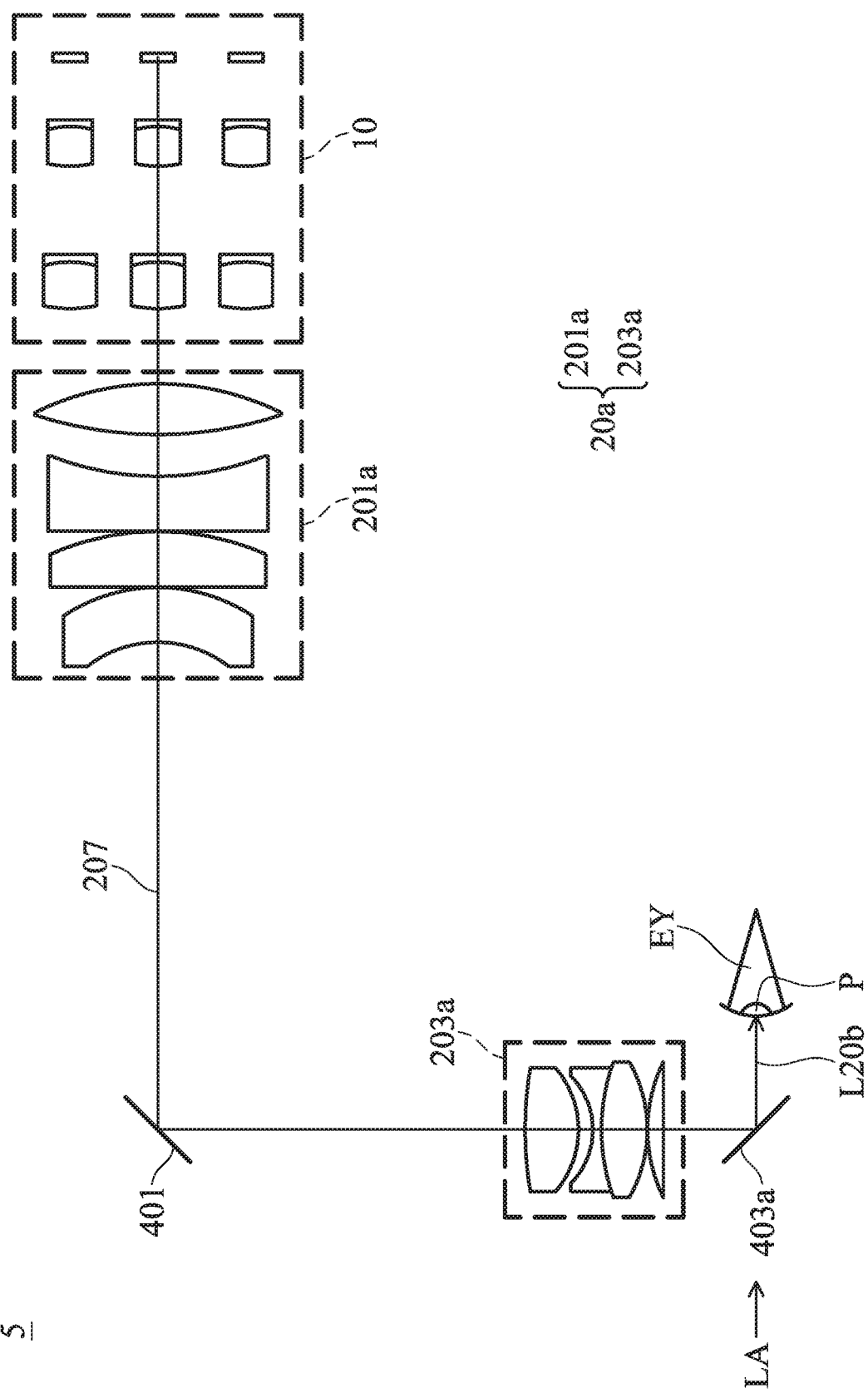
FIG. 7 is a schematic view of a near-eye light field display device in accordance with still another embodiment of the present disclosure.

FIG. 7 is a schematic view of a near-eye light field display device 5 in accordance with still another embodiment of the present disclosure. Referring to FIG. 7, in the embodiment, the near-eye light field display device 5 includes a plurality of sub-aperture light field emitting modules (display device 10) and a bi-telecentric lens group 20a. The near-eye light field display device 5 of the embodiment has a similar structure and function as the near-eye light field display device 4 shown in FIG. 6. The embodiment shown in FIG. 7 is different from the embodiment shown in FIG. 6 in that the near-eye light field display device 5 includes a second light-directing element 403a. In the embodiment, the second light-directing element 403a is a partially penetrating and partially reflecting element. Therefore, the external ambient light source LA can penetrate the second light-directing element 403a to the receiver EY, so that the near-eye light field display device 5 of the embodiment may be applied to an augmented reality or the like, for example.

In the embodiment, the second light-directing element 403a is, for example, a light splitter, or the second light-directing element 403a, for example, has a metal grating layer that allows 50% of incident light beam to pass through and 50% of incident light beam to reflect. However, the disclosure does not limit the kind or form of the second light-directing element 403a.

Figure 8:
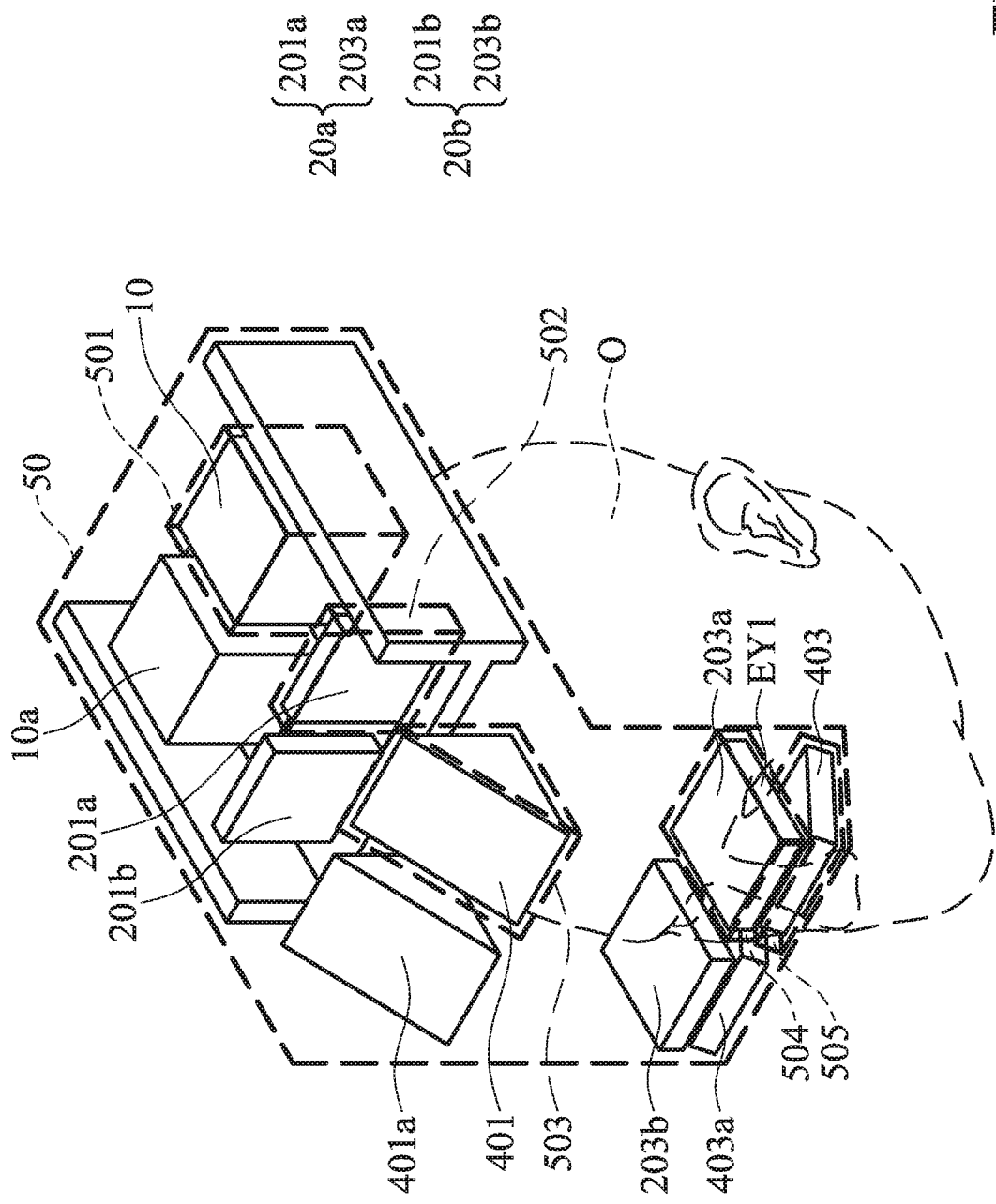
FIG. 8 is a schematic view of a near-eye light field display device in accordance with still another embodiment of the present disclosure.
Figure 9:
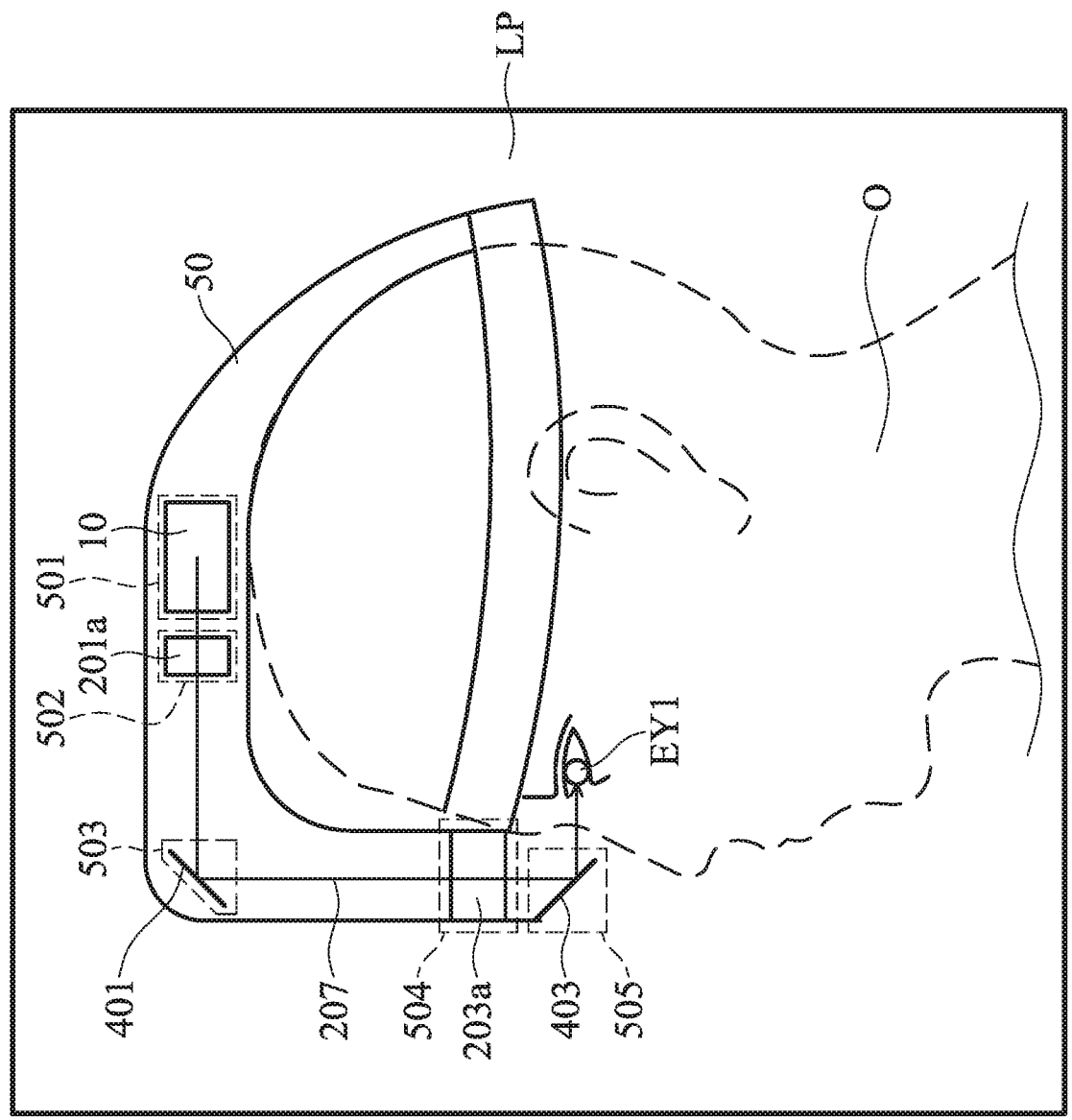
FIG. 9 is a schematic view of the near-eye light field display device in accordance with still another embodiment of the present disclosure.

FIG. 8 is a schematic view of a near-eye light field display device 6 in accordance with still another embodiment of the present disclosure, and FIG. 9 is a schematic view of the near-eye light field display device 6 shown in FIG. 8. Referring to FIG. 8 and FIG. 9, in the embodiment, the near-eye light field display device 6 includes a plurality of sub-aperture light field emitting modules (display device 10) and a bi-telecentric lens group 20a. The near-eye light field display device 6 of the embodiment has a similar structure and function as the near-eye light field display device 4 shown in FIG. 6. The embodiment shown in FIG. 8 and FIG. 9 is different from the embodiment shown in FIG. 6 in that the near-eye light field display device 6 further includes a housing 50. The housing 50 is adapted to be detachably disposed on an object O, and the receiver EY1 is disposed on object O. The object O, for example, may be the head of the user and the receiver EY1 may be the eye of the user, but the disclosure is not limited thereto. For example, the object O may be the head of a robot and the receiver EY1 may be an image capture device of the robot.

The housing 50 includes a first accommodating space 501, a second accommodating space 502, a third accommodating space 503, a fourth accommodating space 504, and a fifth accommodating space 505. The sub-aperture light field emitting modules (display device 10) are disposed in the first accommodating space 501, the first lens group 201a is disposed in the second accommodating space 502, the first light-directing element 401 is disposed in the third accommodating space 503, the second lens group 203a is disposed in the fourth accommodating space 504, and the second light-directing element 403 is disposed in the fifth accommodating space 505. The first accommodating space 501, the second accommodating space 502, and the third accommodating space 503 are arranged in a first direction D1, and the third accommodating space 503, the fourth accommodating space 504, and the fifth accommodating space 505 are arranged in a second direction D2. In the embodiment, the first direction D1 is not parallel to the second direction D2.

Specifically, in the embodiment, an angle A between the first direction D1 and the second direction D2 is between 75 degrees and 105 degrees, but the disclosure is not limited thereto. Therefore, a portion of the near-eye light field display device 6 may be worn on the sides of the head of the user (e.g., above the head or adjacent to the cheek) rather than in front of the eye. Moreover, due to the arrangement of the sub-aperture light field emitting modules 101 and the bi-telecentric lens group 20a, the near-eye light field display device 6 of the disclosure has much higher image quality than common light field display device with microlens array worn in front of the eye. By disposing the housing 50 of the near-eye light field display device 6, which may be suitable for applications requiring very high image quality such as medical treatment, surgery, military applications or industrial applications.

In the embodiment, when the housing 50 is disposed on the object O, the first accommodating space 501 and the fifth accommodating space 505 are located on the same longitudinal plane LP. Therefore, the first accommodating space 501 may be located above the object O, the fifth accommodating space 505 may be located below the first accommodating space 501, and the fifth accommodating space 505 is adjacent to the receiver EY1.

The first accommodating space 501 and the fifth accommodating space 505 being located on the same longitudinal plane LP is merely an example, but the disclosure is not limited thereto. In other embodiments of the disclosure, as long as the first accommodating space 501 is located above of the object O (for example, the head of the user) is sufficient. By disposing the housing 50 of the near-eye light field display device 6, which may be conveniently and comfortably disposed on the object O for various possible applications.

Referring to FIG. 8 again, the near-eye light field display device 6 further includes a display device 10a (a plurality of sub-aperture light field emitting modules), a bi-telecentric lens group 20b, a first light-directing element 401a, and a second light-directing element 403a, wherein the bi-telecentric lens group 20b includes a first lens group 201b and a second lens group 203b. In the embodiment, the structure and function of the display device 10a, the bi-telecentric lens group 20b, the first light-directing element 401a, and the second light-directing element 403a are similar to the display device 10, the bi-telecentric lens group 20a, the first light-directing element 401, and the second light-directing element 403, and details are not described again. The near-eye light field display device 6 of the embodiment may be used as a head mounted display device, wherein the display device 10a (sub-aperture light field emitting modules), the bi-telecentric lens group 20b, the first light-directing element 401a, and the second light-directing element 403a correspond to the other eye (not shown) of the user.

Figure 10:
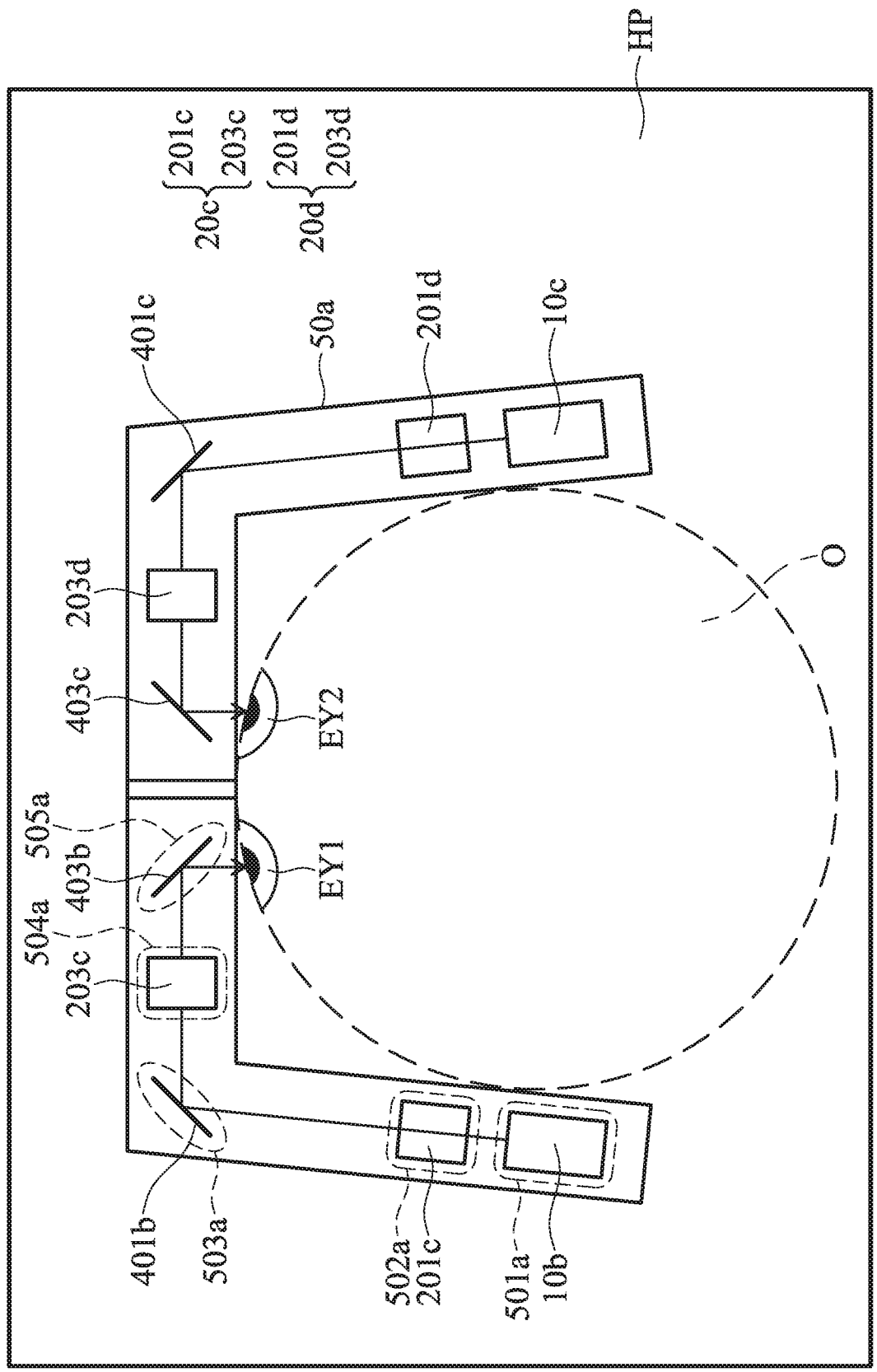
FIG. 10 is a schematic view of a near-eye light field display device in accordance with still another embodiment of the present disclosure.

FIG. 10 is a schematic view of a near-eye light field display device 7 in accordance with still another embodiment of the present disclosure. Referring to FIG. 10, in the embodiment, the near-eye light field display device 7 includes a housing 50a, display devices 10b and 10c (plurality of sub-aperture light field emitting modules), bi-telecentric lens groups 20c and 20d, first light-directing elements 401b and 401c, and second light-directing elements 403b and 403c. The bi-telecentric lens group 20c includes a first lens group 201c and a second lens group 203c, and the bi-telecentric lens group 20d includes a first lens group 201d and a second lens group 203d. The housing 50a includes a first accommodating space 501a, a second accommodating space 502a, a third accommodating space 503a, a fourth accommodating space 504a, and a fifth accommodating space 505a. The near-eye light field display device 7 of the embodiment has a similar structure and function as the near-eye light field display device 6 shown in FIG. 8. The embodiment shown in FIG. 10 is different from the embodiment shown in FIG. 8 in that the first accommodating space 501a and the fifth accommodating space 505a are located on the same horizontal plane HP when the housing 50a is disposed on the object O. Therefore, the first accommodating space 501a may be located on the side of the object O, and the fifth accommodating space 505a is adjacent to the receiver EY1.

In the embodiment, the structure and function of the display devices 10b and 10c (sub-aperture light field emitting modules), the bi-telecentric lens groups 20c and 20d, the first light-directing elements 401b and 401c, and the second light-directing elements 403b and 403c are similar to the display device 10, the bi-telecentric lens group 20a, the first light-directing element 401, and the second light-directing element 403, and details are not described again. The near-eye light field display device 7 of the embodiment may be used as a head mounted display device, wherein the display device 10c (sub-aperture light field emitting modules), the bi-telecentric lens group 20d, the first light-directing element 401c, and the second light-directing element 403c correspond to the other eye (receiver EY2) of the user.

The first accommodating space 501a and the fifth accommodating space 505a being located on the same horizontal plane HP is merely an example, but the disclosure is not limited thereto. In other embodiments of the disclosure, as long as the first accommodating space 501a is located at the side of the object O (for example, the cheek of the user) is sufficient. By disposing the housing 50a of the near-eye light field display device 7, which may be conveniently and comfortably disposed on the object O for various possible applications.

In summary, according to the near-eye light field display device of the embodiment of the disclosure, by disposing a bi-telecentric lens group, the image quality of the near-eye light field display device may be greatly improved.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure and that they may make various changes, substitutions, and alterations herein without departing from the spirit and scope of the present disclosure.

What is claimed is:

1. A near-eye light field display device, comprising:
a plurality of sub-aperture light field emitting modules, wherein the plurality of sub-aperture light field emitting modules are adapted to simultaneously generate a plurality of sub-aperture light fields, and wherein fields of view of sub-images of the plurality of sub-aperture light fields are essentially the same;
a bi-telecentric lens group, disposed on one side of the plurality of sub-aperture light field emitting modules, wherein the plurality of sub-aperture light fields simultaneously pass through the bi-telecentric lens group and are converted into an exit light field by the bi-telecentric lens group, and the exit light field is incident on a receiver, and wherein a field of view of the exit light field is essentially the same as the fields of view of the sub-images of the plurality of sub-aperture light fields.

2. The near-eye light field display device of claim 1, wherein a width of a cross section of the exit light field is smaller than a width of a cross section of the plurality of sub-aperture light fields incident to the bi-telecentric lens group.

3. The near-eye light field display device of claim 1, wherein a width of a cross section of the exit light field is between 2 mm and 8 mm.

4. The near-eye light field display device of claim 1, wherein the exit light field is a light field with a continuous depth of field.

5. The near-eye light field display device of claim 1, wherein each sub-aperture light field emitting module comprises a light emitting panel and a projection lens, the light emitting panel is adapted to generate the sub-aperture light field, and the projection lens is adapted to project the sub-aperture light field to the bi-telecentric lens group.

6. The near-eye light field display device of claim 5, wherein a display panel of the light emitting panel is perpendicular to an optical axis of the bi-telecentric lens group, and an optical axis of the projection lens is parallel to the optical axis of the bi-telecentric lens group.

7. The near-eye light field display device of claim 5, wherein the plurality of projection lenses are Petzval lenses.

8. The near-eye light field display device of claim 5, wherein the plurality of sub-aperture light field emitting modules comprise a center sub-aperture light field emitting module and a plurality of surrounding sub-aperture light field emitting modules, display panels of the light emitting panels of the center sub-aperture light field emitting module and the surrounding sub-aperture light field emitting modules are disposed on a plane perpendicular to an optical axis of the bi-telecentric lens group, a center of the display panel of the light emitting panel of the center sub-aperture light field emitting module is located on the optical axis of the bi-telecentric lens group, and the display panels of the light emitting panels of the surrounding sub-aperture light field emitting modules surround the display panel of the light emitting panel of the center sub-aperture light field emitting module.

9. The near-eye light field display device of claim 5, wherein a transmission direction of the sub-aperture light field generated by the sub-aperture light field emitting module is tilted toward the optical axis of the bi-telecentric lens group.

10. The near-eye light field display device of claim 1, wherein the bi-telecentric lens group comprises a first lens group and a second lens group, and the first lens group is located between the plurality of sub-aperture light field emitting modules and the second lens group.

11. The near-eye light field display device of claim 10, further comprising a first light-directing element and a second light-directing element, wherein the first light-directing element is disposed on an optical path between the first lens group and the second lens group, the first light-directing element is adapted to transmit the plurality of sub-aperture light fields from the first lens group to the second lens group, the second light-directing element is disposed on one side of the second lens group, the second lens group is located between the first light-directing element and the second light-directing element, and the second light-directing element is adapted to transmit the exit light field from the second lens group to the receiver.

12. The near-eye light field display device of claim 11, wherein the second light-directing element is a partially penetrating and partially reflecting element.

13. The near-eye light field display device of claim 11, further comprising a housing, wherein the housing is adapted to be detachably disposed on an object, the housing comprises a first accommodating space, a second accommodating space, a third accommodating space, a fourth accommodating space, and a fifth accommodating space, the plurality of sub-aperture light field emitting modules are disposed in the first accommodating space, the first lens group is disposed in the second accommodating space, the first light-directing element is disposed in the third accommodating space, the second lens group is disposed in the fourth accommodating space, the second light-directing element is disposed in the fifth accommodating space, the first accommodating space and the second accommodating space are arranged in a first direction, the fourth accommodating space and the fifth accommodating space are arranged in a second direction, and the first direction is not parallel to the second direction.

14. The near-eye light field display device of claim 13, wherein an angle between the first direction and the second direction is between 75 degrees and 105 degrees.

15. The near-eye light field display device of claim 13, wherein the first accommodating space and the fifth accommodating space are located on the same longitudinal plane.

16. The near-eye light field display device of claim 13, wherein the first accommodating space and the fifth accommodating space are located on the same horizontal plane.

17. A head mounted display device, comprising:
two near-eye light field display devices, wherein each near-eye light field display device comprises a plurality of sub-aperture light field emitting modules and a bi-telecentric lens group, the plurality of sub-aperture light field emitting modules are adapted to simultaneously generate a plurality of sub-aperture light fields, wherein fields of view of sub-images of the plurality of sub-aperture light fields are essentially the same, the bi-telecentric lens group is disposed on one side of the plurality of sub-aperture light field emitting modules, the plurality of sub-aperture light fields simultaneously pass through the bi-telecentric lens group and are converted into an exit light field by the bi-telecentric lens group, and the exit light field is incident on a receiver, wherein a field of view of the exit light field is essentially the same as the fields of view of the sub-images of the plurality of sub-aperture light fields.

18. The head mounted display device of claim 17, wherein the bi-telecentric lens group comprises a first lens group and a second lens group, and the first lens group is located between the plurality of sub-aperture light field emitting modules and the second lens group;
each near-eye light field display device further comprises a first light-directing element and a second light-directing element, wherein the first light-directing element is disposed on an optical path between the first lens group and the second lens group, the first light-directing element is adapted to transmit the plurality of sub-aperture light fields from the first lens group to the second lens group, the second light-directing element is disposed on one side of the second lens group, the second lens group is located between the first light-directing element and the second light-directing element, and the second light-directing element is adapted to transmit the exit light field from the second lens group to the receiver; and
the head mounted display device further comprises a housing, wherein the housing is adapted to be detachably disposed on an object, the housing comprises a first accommodating space, a second accommodating space, a third accommodating space, a fourth accommodating space, and a fifth accommodating space, the plurality of sub-aperture light field emitting modules are disposed in the first accommodating space, the first lens group is disposed in the second accommodating space, the first light-directing element is disposed in the third accommodating space, the second lens group is disposed in the fourth accommodating space, the second light-directing element is disposed in the fifth accommodating space, the first accommodating space and the second accommodating space are arranged in a first direction, the fourth accommodating space and the fifth accommodating space are arranged in a second direction, and the first direction is not parallel to the second direction.

19. The head mounted display device of claim 18, wherein an angle between the first direction and the second direction is between 75 degrees and 105 degrees.

* * * * *